(12) United States Patent
Lee et al.

(10) Patent No.: US 11,271,417 B2
(45) Date of Patent: Mar. 8, 2022

(54) SYSTEM AND METHOD FOR CONTROLLING CHARGE AND DISCHARGE OF BATTERY

(71) Applicants: Hyundai Motor Company, Seoul (KR); Kia Motors Corporation, Seoul (KR)

(72) Inventors: Ho Joong Lee, Anyang-si (KR); Hye Seung Kim, Gunpo-si (KR); Joon Young Jeon, Seoul (KR); Han Shin Youn, Seoul (KR); Won Yong Sung, Suwon-si (KR); Dong Jun Lee, Suwon-si (KR); Young Jin Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 236 days.

(21) Appl. No.: 16/563,586

(22) Filed: Sep. 6, 2019

(65) Prior Publication Data

US 2020/0287390 A1   Sep. 10, 2020

(30) Foreign Application Priority Data

Mar. 4, 2019   (KR) ........................ 10-2019-0024935

(51) Int. Cl.
*H02J 7/00* (2006.01)
*H01M 10/63* (2014.01)
(Continued)

(52) U.S. Cl.
CPC ............. *H02J 7/007* (2013.01); *H01M 10/44* (2013.01); *H01M 10/615* (2015.04); *H01M 10/63* (2015.04)

(58) Field of Classification Search
CPC ...... H02J 7/007; H02J 7/00712; H02J 7/0068; H02J 7/007194; H02J 2310/48;
(Continued)

(56) References Cited

U.S. PATENT DOCUMENTS

2016/0318418 A1* 11/2016 Tokushige .......... H01M 10/633
2017/0310142 A1* 10/2017 Watanabe ........... H01M 8/0432

FOREIGN PATENT DOCUMENTS

DE   102017220772 A1   12/2018
JP   2017-114311 A   6/2017
(Continued)

*Primary Examiner* — Paul Dinh
(74) *Attorney, Agent, or Firm* — Morgan, Lewis & Bockius LLP (57) ABSTRACT

A method for controlling charge or discharge of a battery in a battery system including a DC converter down-converting an input voltage thereof and outputting an output, a battery connected to an output terminal of the DC converter, and an electric load connected to the output terminal of the DC converter and supplied with electric power from at least one of the DC converter and the battery, may include measuring a temperature of the battery, first controlling, by a controller, an output of the DC converter so that a charging current supplied to the battery from the DC converter becomes a preset maximum value, when the temperature of the battery is lower than a first predetermined temperature, and second controlling, by the controller, the output of the DC converter such that a current of the battery is substantially equal to zero, when the temperature of the battery is higher than a second predetermined temperature which is higher than the first predetermined temperature.

9 Claims, 5 Drawing Sheets

(51) Int. Cl.
  *H01M 10/615* (2014.01)
  *H01M 10/44* (2006.01)
(58) Field of Classification Search
  CPC .... H01M 10/63; H01M 10/615; H01M 10/44;
      H01M 10/425; H01M 2010/4278; H01M
          10/486; H01M 10/443; Y02T 90/14;
      Y02T 10/7072; Y02T 10/72; Y02T 10/70;
            B60L 53/22; B60L 58/13; B60L
        2240/549; B60L 2240/529; B60L 58/26;
          B60L 58/27; B60L 2240/545; B60L
        2210/12; B60L 58/12; B60L 53/24; Y02E
          60/10; G01R 31/382; B60Y 2200/91
  USPC ........................................................ 320/134
  See application file for complete search history.

(56) References Cited

FOREIGN PATENT DOCUMENTS

JP        6248799 B2   12/2017
KR    10-2018-0133984 A   12/2018

* cited by examiner

SYSTEM AND METHOD FOR CONTROLLING CHARGE AND DISCHARGE OF BATTERY

CROSS REFERENCE TO RELATED APPLICATION

The present application claims priority to Korean Patent Application No. 10-2019-0024935 filed on Mar. 4, 2019, the entire contents of which is incorporated herein for all purposes by this reference.

BACKGROUND OF THE DISCLOSURE

Field of the Disclosure

The present invention relates to a system for charging and discharging a battery, and to a system and method for charging and discharging a battery, which allows a battery to rapidly escape from a low- or high-temperature state, thus improving charge and discharge efficiency.

Description of Related Art

An eco-friendly vehicle that generates the driving force of a vehicle using an electric motor includes a high-voltage battery that stores high-voltage electrical energy to drive the electric motor, a low-voltage auxiliary battery that supplies electric power to an electric load of the vehicle, and a low-voltage DC converter (LDC) that down-converts the voltage of the high-voltage battery into the voltage of the auxiliary battery. The low-voltage electric power outputted from the DC converter may be utilized to charge the auxiliary battery or serve as an electric power supply for the electric load.

Thus, the auxiliary battery of the eco-friendly vehicle may be charged with electric power which is outputted from the DC converter, and may be discharged by supplying electric power to the electric load.

A control technique for efficiently controlling the charge and discharge of the auxiliary battery is included in Korean Patent Laid-Open Publication No. 10-2018-0133984 of the same applicant as the disclosure. This proposes the control technique for the DC converter, which minimizes energy loss upon charging and discharging the auxiliary battery, thus improving the fuel efficiency of the vehicle.

On the other hand, the auxiliary battery has very low charge and discharge efficiency at a low temperature below a predetermined temperature or at a high temperature above a predetermined temperature due to chemical properties. Therefore, even if the control technique included in the cited document is applied, the battery may not be efficiently controlled as desired at a low/high temperature.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for controlling the charge and discharge of an auxiliary battery, configured for rapidly controlling the temperature of the auxiliary battery to improve the charge and discharge efficiency of the auxiliary battery at a low temperature below a predetermined temperature or at a high temperature above a predetermined temperature.

According to one aspect, there is provided a system for controlling charge or discharge of a battery including a DC converter down-converting an input voltage thereof and outputting an output and having an output terminal which is connected to the battery; and a controller configured for controlling the output of the DC converter to increase a temperature of the battery when the temperature of the battery is lower than a first predetermined temperature, and controlling the output of the DC converter to reduce the temperature of the battery when the temperature of the battery is higher than a second predetermined temperature which is higher than the first predetermined temperature.

The controller may be configured to control the DC converter so that a charging current inputted into the battery from the DC converter may become a preset maximum value, when the temperature of the battery may be lower than the first predetermined temperature.

The system may further include an electric load connected to the output terminal of the DC converter and supplied with electric power from at least one of the DC converter and the battery, and the controller may stop operating the DC converter when a level of a load current supplied to the electric load may be higher than the charging current inputted into the battery, thus supplying the load current from the battery.

The controller may be configured to control the DC converter so that the charging current inputted into the battery may become the preset maximum value if a charge state of the battery may become equal to or less than a predetermined reference lower-limit value in a state where the DC converter may stop operating.

The controller may include a data map which may previously store a maximum value of the charging current depending on the charge state and the temperature of the battery, may receive a value measuring the charge state and the temperature of the battery and derive the maximum value of the charging current corresponding to the measured value from the data map, and control the DC converter to output the derived maximum value of the charging current.

The controller may be configured to control the output of the DC converter such that the current of the battery may be substantially equal to zero (0), when the temperature of the battery may be higher than the reference upper-limit temperature.

According to another aspect, there is provided a method for controlling charge or discharge of a battery in a battery system including a DC converter down-converting an input voltage thereof and outputting an output, a battery connected to an output terminal of the DC converter, and an electric load connected to the output terminal of the DC converter and supplied with electric power from at least one of the DC converter and the battery, the method including measuring a temperature of the battery; first controlling, by a controller, an output of the DC converter so that a charging current supplied to the battery from the DC converter becomes a preset maximum value, when the temperature of the battery is lower than a first predetermined temperature; and second controlling, by the controller, the output of the DC converter such that a current of the battery is substantially equal to zero, when the temperature of the battery is higher than a second predetermined temperature which is higher than the first predetermined temperature.

The first controlling may include determining a level of an load current supplied to the load; and stopping an operation of the DC converter to supply the load current from the battery, when the load current may be higher than the charging current inputted into the battery.

The first controlling may further include, after the stopping, controlling the DC converter so that the charging current inputted into the battery may become the preset maximum value if the charge state of the battery may become equal to or less than the predetermined reference lower-limit value.

The method may further include providing a data map that stores a maximum value of the charging current according to the charge state and the temperature of the battery, and the first controlling may receive a value measuring the charge state and the temperature of the battery and derive the maximum value of the charging current corresponding to the measured value from the data map, and control the DC converter to output the maximum value of the derived charging current.

According to a further aspect, there is provided a method for controlling charge or discharge of a battery in a battery system including a DC converter down-converting an input voltage thereof and outputting an output, a battery connected to an output terminal of the DC converter, and an electric load connected to the output terminal of the DC converter and supplied with electric power from at least one of the DC converter and the battery, the method including measuring a temperature and a charge state of the battery; repeating, by a controller, a process of controlling the DC converter so that the battery is supplied with a preset maximum charging current and a process of stopping an operation of the DC converter so that the electric load is supplied with a current from the battery, based on the temperature and the charge state of the battery, if the temperature of the battery is lower than a first predetermined temperature; and terminating the repeating if the temperature of the battery is equal to or greater than the first predetermined temperature.

The method may further include second controlling, by the controller, the output of the DC converter such that a current of the battery is substantially equal to zero, if the temperature of the battery is higher than a second predetermined temperature which is higher than the first predetermined temperature.

The system and method for controlling the charge and discharge of the battery controls the DC converter such that the current of the auxiliary battery repeatedly becomes a maximum charging current and a maximum discharging current at a low temperature, thus maximizing the heat generation of the auxiliary battery. Furthermore, the system and method for controlling the charge and discharge of the battery performs the zero-current control of the auxiliary battery at a high temperature, thus suppressing the heat generation of the auxiliary battery as much as possible.

Thus, the system and method for controlling the charge and discharge of the battery allows the auxiliary battery to escape from a temperature range where the charge and discharge efficiency of the auxiliary battery is lowered, as rapidly as possible, thus increasing the charge and discharge efficiency of the auxiliary battery and consequently improving the fuel efficiency of the vehicle and the durability of the auxiliary battery.

The effects obtainable from the present invention are not limited to the above-mentioned effects, and other effects that are not mentioned will be clearly understood by those skilled in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, exemplary embodiments of the present invention will be described in detail with reference to the accompanying drawings.

Figure 1:
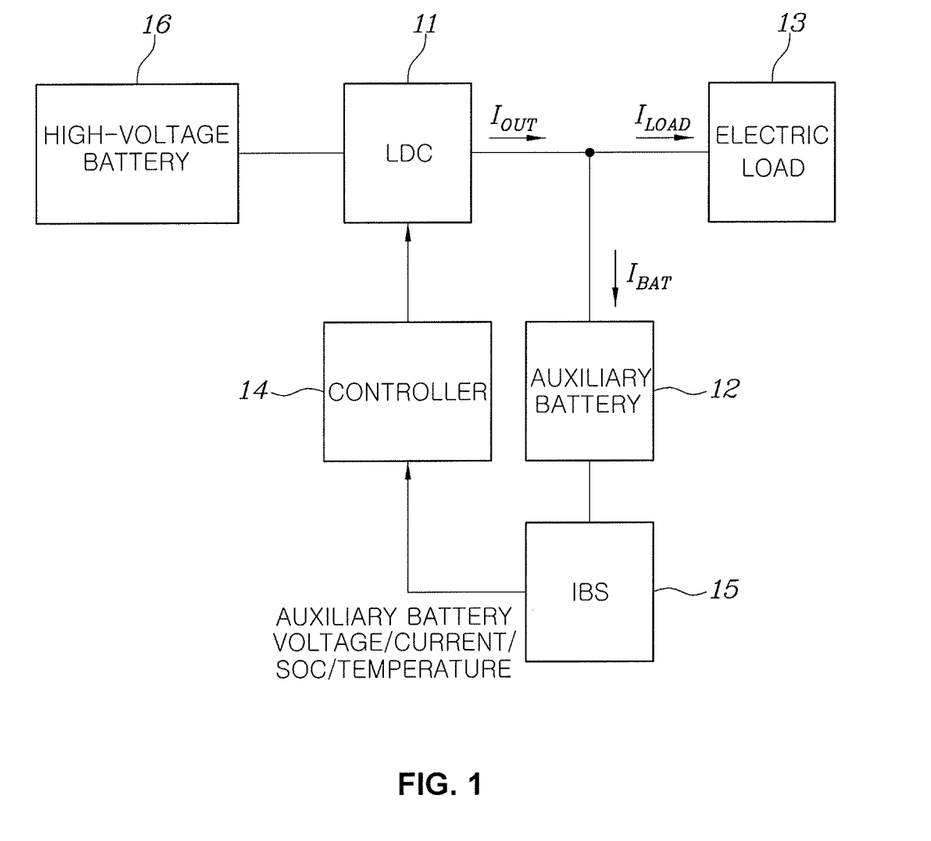
FIG. 1 is a block diagram illustrating a system for controlling the charge and discharge of a battery according to an exemplary embodiment of the present invention.

FIG. 1 is a block diagram illustrating a system for controlling the charge and discharge of a battery according to an exemplary embodiment of the present invention.

Referring to FIG. 1, the system for controlling the charge and discharge of the battery according to the exemplary embodiment of the present invention may include a DC converter (LDC) 11 that converts and outputs a voltage level, an auxiliary battery 12 which is connected to an output terminal of the DC converter 11, an electric load 13, and a controller 14 that controls the output of the DC converter 11 based on the temperature and the state of charge (SOC) value of the auxiliary battery 12.

The DC converter 11 is a component that converts the high voltage of the high-voltage battery 16 storing energy which is to be supplied to an electric motor supplying a driving force to a driving wheel of the vehicle, into a low voltage which may be applied to the auxiliary battery 12 or the electric load 13. The DC converter 11 may be implemented by applying various DC converter topologies that are known to those skilled in the art. Furthermore, the voltage or the current outputted from the DC converter 11 may be controlled by the controller 14. The control method may vary depending on the topology for implementing the DC converter, but may be implemented through the pulse width modulation control or the frequency modulation control of a switching element provided in the DC converter 11.

Since various topologies of the DC converter 11 and thus the method of controlling the output voltage/current are known to those skilled in the art, a detailed description thereof will be omitted herein.

The auxiliary battery 12 may be provided to supply electric power to the electric load 13 applied to the vehicle and may be connected to the output terminal of the DC converter 11 along with the electric load 13. The auxiliary battery 12 may be charged with the current outputted from the DC converter 11, and may be discharged by supplying load electric power which is used in the electric load 13.

The auxiliary battery 12 may be provided with an intelligent battery sensor (IBS) 15 that measures (senses) the level of current (hereinafter referred to as a 'battery current') which is outputted from the auxiliary battery 12 or inputted into the auxiliary battery 12, the level of the terminal voltage (hereinafter referred to as a 'battery voltage') of the auxiliary battery 12 and the temperature of the auxiliary battery 12, and then determines the charge state of the auxiliary battery 12 using a preset calculation algorithm or previously stored map data based on the detected results.

Although not shown in the drawings, the output terminal of the DC converter 11 may also have a current sensor to measure the output current of the DC converter 11, and the current sensor may also be provided on a front end portion of the electric load 13 to measure the load current supplied to the electric load 13.

In a detailed description of the present invention, since it is apparent to those skilled in the art that measured values required to control the DC converter 11 will be obtained by various sensors including the intelligent battery sensor 15, the description of the kind of the sensor for obtaining several measured values will be omitted herein.

The controller 14 controls the output of the DC converter 11 based on the temperature, the charge state and/or the battery current of the auxiliary battery 12, the output current of the DC converter 11 and/or the load current of the electric load 13. According to several embodiments of the present invention, if the temperature of the auxiliary battery 12 is a low temperature below a predetermined temperature level or a high temperature above a predetermined temperature level, the temperature of the auxiliary battery 12 may be controlled to be within a range that allows charging and discharging operation to be efficiently controlled.

The controller 14 may be implemented in the form including a processor that executes determination for implementing a preprogrammed algorithm and outputs a control signal or a command signal depending on the determination, and a memory that stores various information required to implement the algorithm. Furthermore, the controller 14 may be implemented by additionally programming the algorithm for implementing the present invention in the controller for controlling the DC converter which is separately provided to implement the present invention or is provided in the DC converter 11.

The detailed operation, action, and effect of the system for controlling the charge and discharge of the battery according to the exemplary embodiment of the present invention configured as described above will be described with reference to a method for controlling the charge and discharge of a battery, which will be described later.

Figure 2:
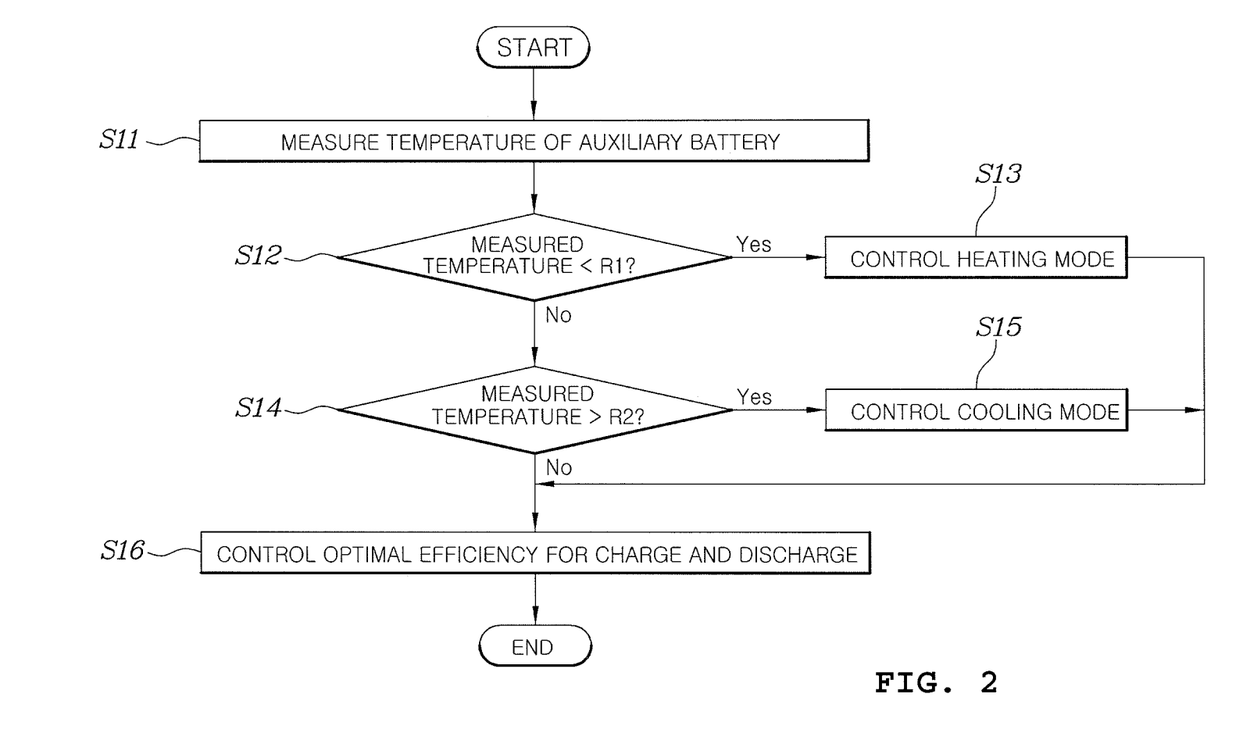
FIG. 2 is a flowchart illustrating a method for controlling the charge and discharge of a battery according to an exemplary embodiment of the present invention.

FIG. 2 is a flowchart illustrating a method for controlling the charge and discharge of a battery according to an exemplary embodiment of the present invention.

Referring to FIG. 2, the method for controlling the charge and discharge of the battery according to the exemplary embodiment of the present invention may measure the temperature of the auxiliary battery 12 using the IBS 15 or the like at step S11, may control a heating mode in which the controller 14 increases the temperature of the auxiliary battery 12 if the temperature of the auxiliary battery 12 is lower than a predetermined reference lower-limit temperature R1 at step S13, and may control a cooling mode in which the controller 14 decreases the temperature of the auxiliary battery 12 if the temperature of the auxiliary battery 12 is higher than a predetermined reference upper-limit temperature R2 at step S15. If the temperature of the auxiliary battery 12 is equal to or greater than the predetermined reference lower-limit temperature R1 and is equal to or less than the reference upper-limit temperature R2, the charge and discharge of the auxiliary battery 12 may be controlled by applying a preset optimal efficiency control technique for charge and discharge at step S16. For example, the optimal efficiency control technique for charge and discharge performed at step S16 may be performed by controlling the DC converter 11 using the control technique included in Korean Patent Laid-Open Publication No. 10-2018-0133984 that was previously filed by the same applicant as the present invention.

In this regard, the predetermined reference lower-limit temperature R1 and reference upper-limit temperature R2 may be a temperature at which the efficiency of charging and discharging the auxiliary battery 12 is dramatically lowered, and may be previously derived by an experimental method to be stored in the controller 14.

Several embodiments of the present invention are intended to control the DC converter 11 such that the temperature of the auxiliary battery 12 is rapidly changed to a temperature range in which the charge and discharge efficiency is good, namely, a temperature range between the predetermined reference lower-limit temperature R1 and the reference upper-limit temperature R2, if the temperature of the auxiliary battery 12 is less than the predetermined reference lower-limit temperature R1 and is higher than the predetermined reference upper-limit temperature R2.

Therefore, in the method for controlling the charge and discharge of the battery according to the exemplary embodiment of the present invention, if the measured temperature of the auxiliary battery is lower than the predetermined reference lower-limit temperature R1, the controller 14 controls the heating mode to increase the temperature of the auxiliary battery 12 at step S13.

Figure 3:
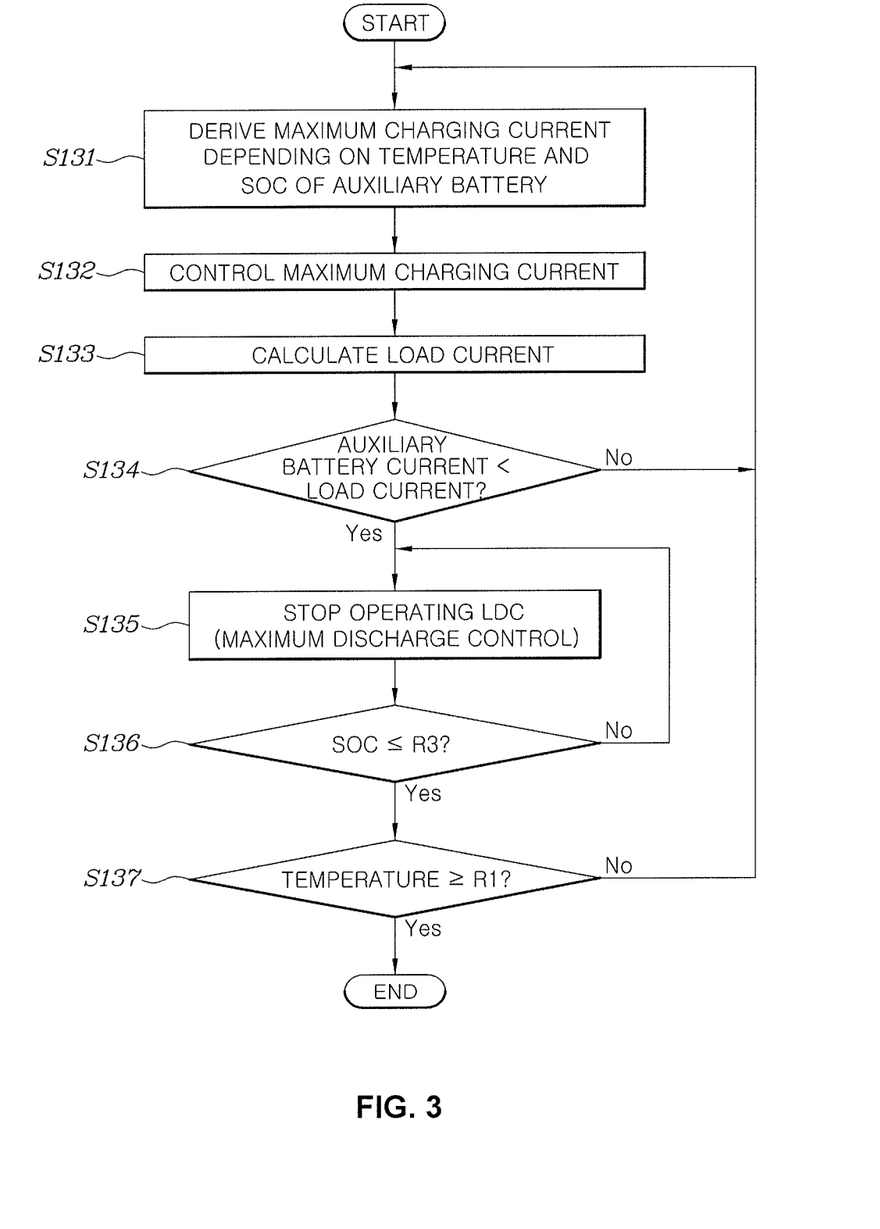
FIG. 3 is a detailed flowchart illustrating a step of controlling a heating mode of the method for controlling the charge and discharge of the battery according to the exemplary embodiment of the present invention.

FIG. 3 is a detailed flowchart illustrating the step of controlling the heating mode of the method for controlling the charge and discharge of the battery according to the exemplary embodiment of the present invention.

Referring to FIG. 3, the heating-mode control step S13 of the method for controlling the charge and discharge of the battery according to the exemplary embodiment of the present invention may include a step S131 of deriving a maximum charging current depending on the charge state and temperature of the auxiliary battery 12 inputted into the controller 14, and a step S132 of controlling the DC converter 11 such that the derived maximum charging current is supplied to the auxiliary battery 12.

The controller 14 may previously store in a form of the data map the maximum charging current which is the maximum value of the charging current depending on the charge state (SOC) and temperature of the auxiliary battery 12. This data map previously derives the maximum value of the charging current received by the auxiliary battery 12 in an experimental manner, while changing the temperature and charge state of the auxiliary battery 12 in the development stage of the system, and previously records the maximum charging current depending on the temperature and charge state of the auxiliary battery 12. This data map may be in a form of a two-dimensional data map, which inputs the temperature and charge state of the auxiliary battery 12 and outputs the maximum charging current corresponding thereto.

Figure 4:
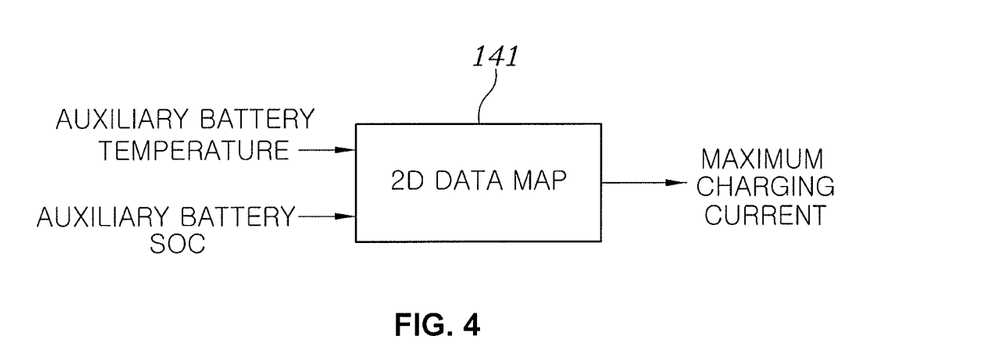
FIG. 4 is a view exemplarily illustrating an example of a data map stored in a controller of the system for controlling the charge and discharge according to the exemplary embodiment of the present invention.

FIG. 4 is a view exemplarily illustrating an example of the data map stored in the controller of the system for controlling the charge and discharge according to the exemplary embodiment of the present invention. If the actually measured temperature and actually derived charge state of the auxiliary battery 12 are inputted into the controller 14, it inputs the temperature and the charge state into the data map 141 and then derives the maximum charging current corresponding thereto at step S131. Subsequently, the controller 14 may control the output current of the DC converter 11 such that the derived maximum charging current is supplied to the auxiliary battery 12. The output current of the DC converter 11 may be controlled by a common control technique such as a proportional-integral (PI) control or a proportional-integral-derivative (PID) control, which minimizes the error of two values so that the current of the auxiliary battery 12 may follow the maximum charging current.

Thus, the exemplary embodiment of the present invention sets the charging current to the maximum in the state where the temperature of the auxiliary battery 12 is a low temperature at which the charge and discharge efficiency is lowered, thus causing the auxiliary battery 12 to generate heat and thereby allowing the temperature of the auxiliary battery 12 to be rapidly increased.

Moreover, in the heating-mode control step S13 of the method for controlling the charge and discharge of the battery according to the exemplary embodiment of the present invention, the controller 14 may determine an load current $I_{LOAD}$ supplied to the electric load 13 at step S133, and may stop the operation of the DC converter 11 if the charging current $I_{BAT}$ supplied to the auxiliary battery 12 is smaller than the load current $I_{LOAD}$, so that the output current $I_{OUT}$ of the DC converter 11 becomes zero and the whole load current is supplied by discharging the auxiliary battery 12 at step S135.

Figure 5:
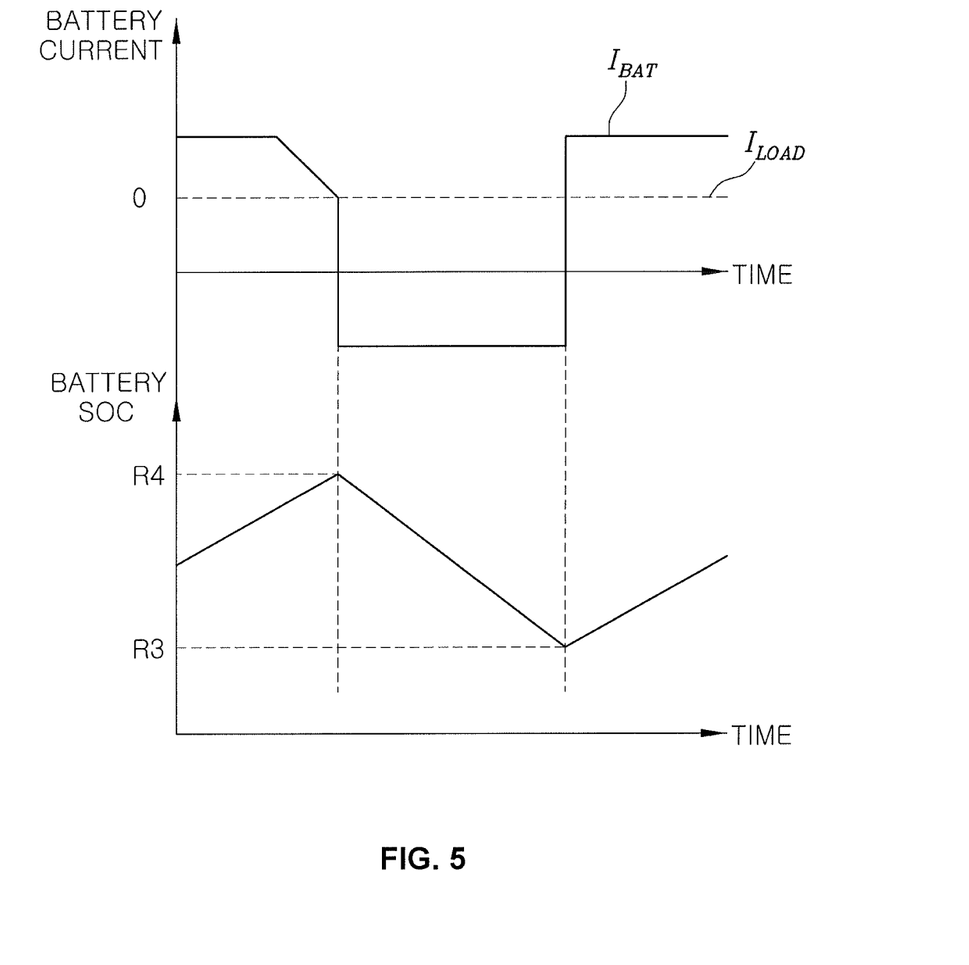
FIG. 5 is a graph illustrating the charging current and load current of the auxiliary battery and a graph illustrating the charge state of the auxiliary battery in the step of controlling the heating mode of the method for controlling the charge and discharge of the battery according to the exemplary embodiment of the present invention.

FIG. 5 is a graph illustrating the charging current and load current of the auxiliary battery and a graph illustrating the charge state of the auxiliary battery in the step of controlling the heating mode of the method for controlling the charge and discharge of the battery according to the exemplary embodiment of the present invention.

At step S132, the charging current supplied to the auxiliary battery 12 is gradually reduced if the charge state of the auxiliary battery 12 rises and reaches a predetermined level. If the charging current $I_{BAT}$ of the auxiliary battery 12 is reduced to be smaller than the load current $I_{LOAD}$, the controller 14 determines that the auxiliary battery 12 is sufficiently charged to supply the load current $I_{LOAD}$ using only the auxiliary battery 12, and stops operating the DC converter 11 so that the discharging current of the auxiliary battery 12 is maximized. Thus, the discharging of the auxiliary battery 12 charged to a predetermined level R4 of charge state is started, and the output current of the DC converter 11 is zero. Hence, the whole load current $I_{LOAD}$ is supplied by the auxiliary battery 12 and the charge state of the auxiliary battery 12 is reduced.

Thus, the method for controlling the charge and discharge of the battery according to the exemplary embodiment of the present invention charges the auxiliary battery 12 to a predetermined level with the maximum charging current, and then discharges the auxiliary battery to supply the whole load current, so that the maximum discharging is performed. Therefore, the auxiliary battery 12 is charged with the maximum charging current, and then outputs the maximum discharging current, thus maximizing the heat generation of the auxiliary battery 12.

Moreover, in the heating-mode control step S13 of the method for controlling the charge and discharge of the battery according to the exemplary embodiment of the present invention, the controller 14 may control the DC converter 11 again so that the auxiliary battery 12 is supplied with the maximum charging current as described above, if the charge state of the auxiliary battery 12 reaches the predetermined reference lower-limit value R3 while the DC converter 11 stops operating and the auxiliary battery 12 is discharged to the maximum. This predetermined reference lower-limit value R3 may be a lower-limit value for the charge state of the auxiliary battery 12 to prevent the performance of the auxiliary battery 12 from being deteriorated.

If the temperature of the auxiliary battery 12 is a low temperature at which the charge and discharge efficiency is lowered, the method for controlling the charge and discharge of the battery according to the exemplary embodiment of the present invention controls the DC converter 11 such that the auxiliary battery 12 is repeatedly charged with the maximum charging current and outputs the maximum discharging current, thus increasing the temperature of the auxiliary battery 12 to the maximum and allowing the auxiliary battery to rapidly escape from a temperature range in which the charge and discharge efficiency is lowered.

Meanwhile, the above-described heating-mode control step S13 may be performed until the temperature of the auxiliary battery 12 is equal to or greater than the predetermined reference lower-limit temperature R1 at step S137. Although it is shown in FIG. 3 that the step S137 of determining the temperature of the auxiliary battery 12 for terminating the heating-mode control step S13 is performed subsequent to step S136, this is merely an example. The temperature of the auxiliary battery 12 may be measured at any time. Hence, the heating-mode control step S13 may be terminated by determining the temperature of the auxiliary battery 12 at any time during steps S131 to S136.

Figure 6:
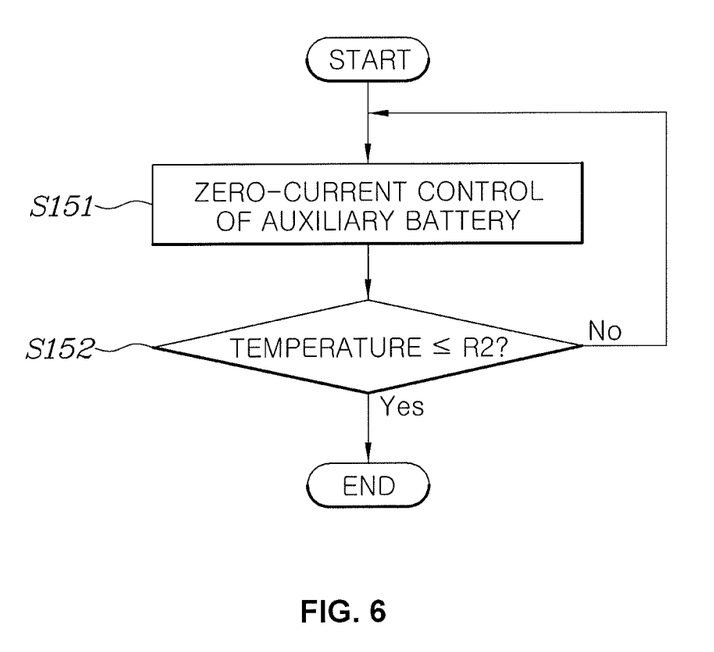
FIG. 6 is a detailed flowchart illustrating a step of controlling a cooling mode of the method for controlling the charge and discharge of the battery according to the exemplary embodiment of the present invention.

FIG. 6 is a detailed flowchart illustrating a step of controlling a cooling mode of the method for controlling the charge and discharge of the battery according to the exemplary embodiment of the present invention.

Referring to FIG. 6, the cooling-mode control step S15 of the method for controlling the charge and discharge of the battery according to the exemplary embodiment of the present invention may include step S151 in which the controller 14 performs a zero-current control to make the current of the auxiliary battery 12 zero. The controller 14 may control such that a value measuring the current of the auxiliary battery 12 becomes zero, using the control technique such as the proportional-integral (PI) control or the proportional-integral-derivative (PID) control. Thus, if the current of the auxiliary battery 12 is controlled to be zero, the heat generated by the auxiliary battery 12 itself may be suppressed, the temperature of the battery 12 may be reduced as rapidly as possible with the aid of the surrounding water-cooled or air-cooled cooling device. The above-described cooling-mode control step S15 may be performed until the temperature of the auxiliary battery 12 is equal to or less than the predetermined reference upper-limit temperature R2 at step S137.

As having described, the system and method for controlling the charge and discharge of the battery according to several embodiments of the present invention controls the DC converter such that the current of the auxiliary battery repeatedly becomes a maximum charging current and a maximum discharging current at a low temperature, thus maximizing the heat generation of the auxiliary battery. Furthermore, the system and method for controlling the charge and discharge of the battery according to several embodiments of the present invention performs the zero-current control of the auxiliary battery at a high temperature, thus suppressing the heat generation of the auxiliary battery as much as possible. Thus, the present invention allows the auxiliary battery to escape from a temperature range where the charge and discharge efficiency of the auxiliary battery is lowered, as rapidly as possible, thus increasing the charge and discharge efficiency of the auxiliary battery and consequently improving the fuel efficiency of the vehicle and the durability of the auxiliary battery.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling charge or discharge of a battery, the system comprising:
   a DC converter down-converting an input voltage thereof and outputting an output and having an output terminal which is connected to the battery; and
   a controller connected to the DC converter and configured for controlling the output of the DC converter to increase a temperature of the battery upon determining that the temperature of the battery is lower than a first predetermined temperature, and for controlling the output of the DC converter to reduce the temperature of the battery upon determining that the temperature of the battery is higher than a second predetermined temperature which is higher than the first predetermined temperature,
   wherein the controller is configured to control the DC converter so that a charging current inputted into the battery from the DC converter becomes a predetermined maximum value, upon determining that the temperature of the battery is lower than the first predetermined temperature, and
   wherein the controller includes a data map that previously stores a maximum value of the charging current depending on a charge state and the temperature of the battery, receives a value measuring the charge state and the temperature of the battery and derives the maximum value of the charging current corresponding to the measured value from the data map, and controls the DC converter to output the derived maximum value of the charging current.

2. The system according to claim 1, further including:
   an electric load connected to the output terminal of the DC converter and supplied with electric power from at least one of the DC converter and the battery,
   wherein the controller is configured to stop operating the DC converter upon determining that a level of a load current supplied to the electric load is higher than the charging current inputted into the battery, thus supplying the load current from the battery to the electric load.

3. The system according to claim 2, wherein the controller is configured to control the DC converter so that the charging current inputted into the battery becomes the predetermined maximum value upon determining that the charge state of the battery is equal to or less than a predetermined value in a state where the DC converter stops operating.

4. The system according to claim 1, wherein the controller is configured to control the output of the DC converter such that a load current of the battery is equal to zero, upon determining that the temperature of the battery is higher than the second predetermined temperature.

5. A method of controlling charge or discharge of a battery in a battery system including a DC converter down-converting an input voltage thereof and outputting an output, the battery connected to an output terminal of the DC converter, and an electric load connected to the output terminal of the DC converter and supplied with electric power from at least one of the DC converter and the battery, the method comprising:
   measuring a temperature of the battery;
   first controlling, by a controller, an output of the DC converter so that a charging current supplied to the battery from the DC converter becomes a predetermined maximum value, upon determining that the temperature of the battery is lower than a first predetermined temperature;
   second controlling, by the controller, the output of the DC converter such that a current of the battery is equal to zero, upon determining that the temperature of the battery is higher than a second predetermined temperature which is higher than the first predetermined temperature;

providing a data map that stores a maximum value of the charging current according to a charge state and the temperature of the battery; and in the first controlling, receiving a value measuring a charge state and the temperature of the battery and deriving the maximum value of the charging current corresponding to the measured value from the data map, and controlling the DC converter to output the maximum value of the derived charging current.

6. The method according to claim 5, wherein the first controlling includes:

determining a level of a load current supplied to the electric load from the DC converter; and stopping an operation of the DC converter to supply the load current from the battery, upon determining that the load current is higher than the charging current inputted into the battery.

7. The method according to claim 6, wherein the first controlling further includes:

after the stopping, controlling the DC converter so that the charging current inputted into the battery becomes the predetermined maximum value upon determining that the charge state of the battery becomes equal to or less than a predetermined value.

8. A method of controlling charge or discharge of a battery in a battery system including a DC converter down-converting an input voltage thereof and outputting an output, a battery connected to an output terminal of the DC converter, and an electric load connected to the output terminal of the DC converter and supplied with electric power from at least one of the DC converter and the battery, the method comprising:

measuring a temperature and a charge state of the battery;

repeating, by a controller, a process of controlling the DC converter so that the battery is supplied with a charging current corresponding to a predetermined maximum charging current and a process of stopping an operation of the DC converter so that the electric load is supplied with a current from the battery, based on the temperature and the charge state of the battery, upon determining that the temperature of the battery is lower than a first predetermined temperature;

terminating, by the controller, the repeating, upon determining that the temperature of the battery is equal to or greater than the first predetermined temperature; and providing a data map that stores a maximum value of the charging current according to the charge state and the temperature of the battery, in the repeating, receiving a value measuring the charge state and the temperature of the battery and deriving the maximum value of the charging current corresponding to the measured value from the data map, and controlling the DC converter to output the maximum value of the derived charging current.

9. The method according to claim 8, further including:

second controlling, by the controller, the output of the DC converter such that the current of the battery is equal to zero, upon determining that the temperature of the battery is higher than a second predetermined temperature which is higher than the first predetermined temperature.

* * * * *